United States Patent [19]

Hughes

[11] 4,135,743
[45] Jan. 23, 1979

[54] HEAT RECOVERABLE COUPLING FOR TUBING

[75] Inventor: John R. Hughes, Atherton, Calif.
[73] Assignee: Raychem Corporation, Menlo Park, Calif.
[21] Appl. No.: 830,404
[22] Filed: Sep. 6, 1977
[51] Int. Cl.$^2$ ............................................... F16L 55/00
[52] U.S. Cl. ........................... 285/115; 285/381; 285/382.7; 285/417
[58] Field of Search .................. 285/381, 382.2, 382.1, 285/382, 382.7, 114, 417, 115, 256, 116, 369, 328, 422, 373, 419; 29/447, 521, 526, 516; 403/273, 284, 278, 284, 285

[56] References Cited

U.S. PATENT DOCUMENTS

| 198,035 | 12/1877 | Matheson | 285/115 |
|---|---|---|---|
| 2,251,718 | 8/1941 | Parker | 285/115 X |
| 2,313,780 | 3/1943 | Snyder | 285/116 |
| 2,418,418 | 4/1947 | Martin et al. | 285/381 X |
| 2,797,111 | 6/1957 | Beazley | 285/256 X |
| 3,287,034 | 11/1966 | Bragg | 285/281 X |
| 3,805,567 | 4/1974 | Sinerco | 285/381 |

Primary Examiner—Dave W. Arola
Attorney, Agent, or Firm—Lyon & Lyon

[57] ABSTRACT

A coupling of heat recoverable metallic material for joining tubular members and other cylindrical substrates. The couplings include a hollow member having at least one opening for receipt of a tube. This hollow member is designed to eliminate relative motion between the ends of the member and the tubing during flexure of the tubing and coupling assembly. This elimination of such relative motion is accomplished by incorporating thin-walled sections at each end of the hollow member with collars located outwardly of the thin-walled sections. The collars tightly grip the tubing to prevent relative motion between the collar and the tubing while the thin-walled sections allow flexural response of the coupling to the flexure of the tubing itself.

11 Claims, 6 Drawing Figures

HEAT RECOVERABLE COUPLING FOR TUBING

BACKGROUND OF THE INVENTION

This invention is directed to a coupling for tubing. More specifically, this invention is directed to a heat recoverable metal coupling for metal tubing.

A variety of heat recoverable metal couplings have been developed for joining tubing and the like together for such applications as aircraft hydraulic systems and the like. One such device is disclosed in Harrision et al, *HEAT RECOVERABLE METALLIC COUPLING*, Ser. No. 410,314, filed Oct. 29, 1973, which is assigned to the assignee of the present invention and is incorporated herein by reference. Other forms of such couplings include those with smooth bores, serrated bores, toothed inserts and the like. The bodies of these heat recoverable metallic coupings are often tapered at the ends to reduce the stress loading on the tubing positioned in the coupling under bending loads. By tapering the ends of the coupling, the coupling is more able to flex and distribute the load over a broader area of the tubing. This prevents or significantly reduces failure of the tubing as a result of high stress concentration.

Although high bending stress may be substantially reduced by tapering the ends of the coupling member, the flexing of tubing at the coupling causes relative movement between the ends of the coupling and the underlying tubing. This relative motion is generally longitudinal in nature and causes chafing, fretting and galling of the tubing over a period of time. This working of the tubing is especially acute in aircraft and other applications where vibration occurs for continued periods of time. The roughened, pitted area thus formed results in points of high stress concentration in the tubing which, through continued flex cycling, lead to the propagation of cracks through the tube wall eventually resulting in tube failure. Unsatisfactory attempts have been made to eliminate or reduce the amount of chafing which occurs at the ends of the coupling members. Lubricants have been applied to the interface between the coupling and tubing as an attempt to reduce the friction at the interface. It remains that certain gall prone materials are subject to the eventual failure at locations near the end of metallic couplings because of the relative motion between components.

SUMMARY OF THE INVENTION

The present invention is designed to eliminate relative motion at the ends of heat recoverable metal couplings as a means for preventing chafing, fretting or galling of the tubing associated therewith to avoid eventual tube failures. To accomplish this end, a heat recoverable metallic coupling is here disclosed which includes a body having a generally cylindrical section and stress distribution sections extending from the generally cylindrical section to rigid collars. The entire structure is of a heat recoverable nature and usually is of unitary construction, although a composite construction using a liner of another metal or material is feasible and would be desirable in certain applications, as, for instance, where a substance corrosive to the heat recoverable metal is to be contained in the tubing.

The stress distribution sections provide a transition from the thick-walled cylindrical section to thin-walled ends of the stress distribution sections. At the generally cylindrical section, the body is in most instances more rigid than the tubing with which the coupling is to be employed. At the ouher ends of the stress distribution sections, the walls of the coupling are thin and the coupling is at least as flexible as the tubing. Thus, each end of the coupling provides an area of increasing strength such that the tubes extending into the coupling will experience stress loading from flexure of the tubing over a broad area rather than concentrated at a rigid edge of an untapered coupling.

The stress distribution sections further provide a strength gradient with respect to tensile and compressive loading. Again, the tensile and compressive strengths of the coupling decrease from the comparatively rigid cylindrical sections to the thin-walled ends. At the thin-walled ends, the compressive and tensile strengths of the coupling are less than those of the tubing with which the coupling is to be employed.

The collars located outwardly of the stress distribution sections have a transverse wall thickness which is substantially greater than the thin-walled ends adjacent thereto. The thickness and recovered inside dimension of each collar provide recovery hoop strength to tightly grip the tube extending therethrough. The recovery hoop strength is designed to create sufficient friction between each collar and the adjacent section of tubing to overcome the linear flexural strength of each composite stress distribution section. The linear flexural strength is that strength tending to create relative longitudinal motion between the coupling and the underlying tubing when the tubing is subjected to flexure. In other words, the gripping of the tubing is such that the collars will not slide longitudinally along the tubing during flexure of the tubing. Thus, compression and elongation is experienced inwardly of the collars in the stress distribution sections. As a result, little or no relative longitudinal motion between the coupling and the tubing is experienced. Thus, it has been found that the amount of chafing, fretting or galling can be either eliminated or reduced to an inconsequential amount by the application of the present invention.

Accordingly, it is an object of the present invention to provide an improved heat recoverable metallic coupling.

It is another object of the present invention to provide a heat recoverable metallic coupling which reduces the incidence of chafing, fretting and galling of the tubing extending therethrough.

It is a further object of the present invention to provide a heat recoverable metallic coupling wherein the outermost portions of the coupling do not move relative to tubing extending therethrough durig flexing of that tubing.

Moreover, it is an object of the present invention to provide improved heat recoverable couplings which do not concentrate bending stress or substantially weaken the tubing extending therethrough.

Other and further objects and advantages will appear hereinafter.

DETAILED DESCRIPTION OF THE PREFERRED EMBODIMENT

Figure 1:
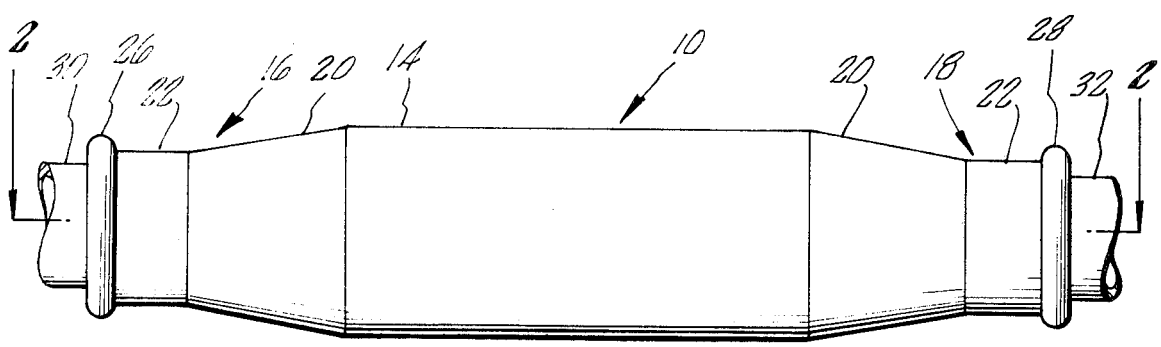
FIG. 1 is a plan view of a coupling assembled with tubing according to the present invention.
Figure 2:
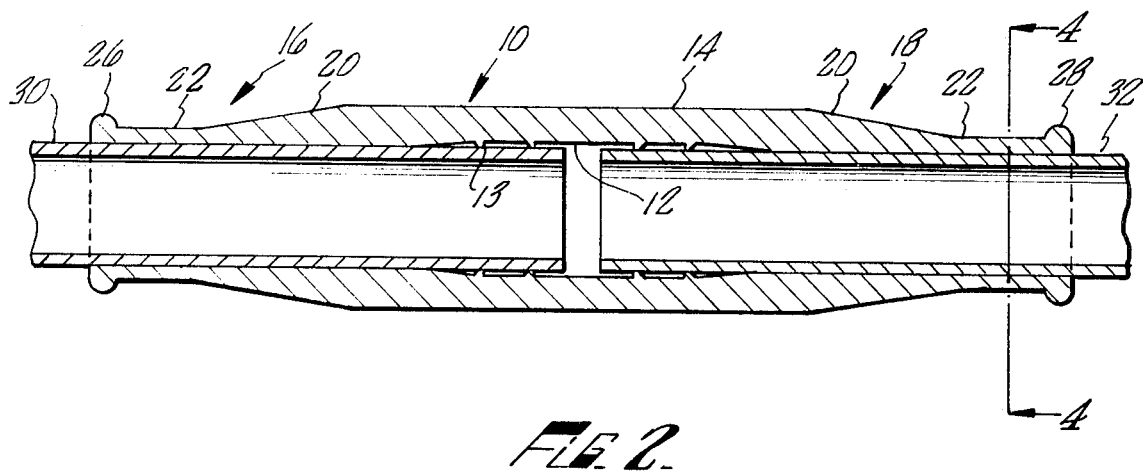
FIG. 2 is a cross-sectional elevation taken along line 2—2 of FIG. 1.
Figure 3:
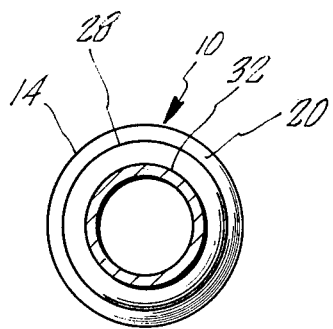
FIG. 3 is an end view of the coupling.
Figure 4:
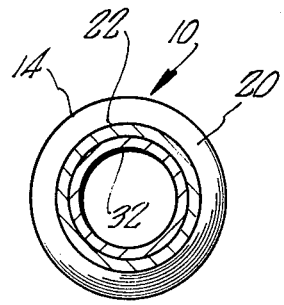
FIG. 4 is a cross-sectional end view taken along line 4—4 of FIG. 2.

Turning in detail to the drawings, the coupling is illustrated as a hollow member 10 fabricated from a heat recoverable metallic material. The hollow member 10 is of unitary construction. However, composite structures may also be employed without departing from the invention concepts of the present invention. It is further to be understood that the present invention may be in the form of a T-shaped member or other member capable of accepting three or more incoming tubes. Furthermore, only a single opening may be employed at one end of the hollow body to form an end cap.

The hollow member 10 includes a main, substantially cylindrical hollow body section 14. In the present embodiment, a substantially cylindrical bore 12 extends the length of the hollow member 10. The bore may include serrations or teeth such as disclosed in Harrison et at, *HEAT RECOVERABLE METALLIC COUPLING*, Ser. No. 410,314, filed Oct. 29, 1973, or be completely smooth. Two annular teeth 13 are associated with each side of the coupling. It has been found that the teeth 13 substantially improve the sealing capabilities of the coupling.

At either end of the main, substantially cylindrical hollow body section 14, stress distribution sections 16 and 18 extend longitudinally from the cylindrical section to collars 26 and 28. The stress distribution sections 16 and 18 each include a tapered portion 20 and a thin-walled section 22 in the present embodiment. The tapered portions 20 act to distribute the resistance to bending of the hollow member 10 when the tubes extending into the hollow member 10 are strained under a bending load. The walls of the tapered portions 20 offer decreasing resistance to the strain imposed by the tubes because of the decreasing cross section of the walls of the tapered portion 20. This allows distribution of the load across a greater length of the tubes to prevent fatigue failure at a specific high stress point at the edge of a stiff untapered coupling.

The thin-walled portions 22 extend from the tapered portion 20 to the collars 26 and 28. The length of each thin-walled portion 22 is preferably approximately one-fifth to equal to the outside diameter of the thin-walled portion. The bore of the thin-walled portion 22 is generally smooth, although properly designed inward projections may be incorporated. The thin-walled sections 22 act to extend the relatively flexible ends of the tapered portion 20 to eliminate the edge formed by more conventional couplings at the end of similar tapered portions. The conventional couplings tend to promote chafing, fretting or galling because of relative longitudinal motion at the ends of the coupling between the coupling and the tubing extending therethrough. The thin-walled sections remove the ends of the coupling away from the heavier portions of the taper.

The collar 26 and 28 are located at the extended ends of the thin-walled sections 22. The collar 26 and 28 are substantially thicker in transverse crosssection than the thin-walled sections 22. These collars 26 and 28 are also of heat recoverable metallic material and are sized to tightly conform to the tubing positioned within the coupling upon heat recovery of the collars. The collars 26 and 28 may have a transverse wall thickness which is equal to the thickness of the main wall portion of the coupling. However, in most applications, it is not necessary to have a collar as thick as the main wall portion.

The relative longitudinal holding capacity of the collars 26 and 28 based on the hoop strength of the collars 26 and 28 and the stress induced by the recovery of the undersized collars about the tubing the designed to exceed the longitudinal force that can be transmitted by elastic deformation of the thin-walled sections 22. Consequently, the collars 26 and 28 will remain fixed relative to the tubing regardless of the flexure of the tubing. With the tubing strained in a bending mode, the thin-walled sections 22 experience elastic deformation thereby allowing the tubing to flex relative to the main, cylindrical hollow body section 14 without displacing the collars. The thin-walled sections 22 also have a flexural strength which is no greater than that of the tubing with which the coupling is to be employed. If the strength of the thin-walled sections 22 were greater than the tubing, the tubing would be excessively stressed at the ends of the coupling which could result in early failure of the tubing. A gradual decrease in the bending moment in the tubing from a maximum stress at the coupling ends to zero near the center is necessary for good flex life. Thus, it will be apparent that the function of the thin-walled extensions between the tapered sections and the collars is to permit the collars to move with the tubing as it bends and also to transmit linear stress to the tapered sections so thay they will also move with tubing. In this way, all, or nearly all, relative motion between the tubing and coupling is eliminated.

The heat recoverable porperties of a hollow member 10 are advantageous for both the main, hollow body portion 14 and the collars 26 and 28. The main, hollow body portion 14, when recovered about tubes, such as shown in the figures as 30 and 32, prevents longitudinal extraction of the tubes from the coupling and provides a seal to prevent leakage of high pressure fluid which may be contained within the tubing through the coupling. At the same time, the recovery of the collars 26 and 28 acts to retain the collars in position on the tubing 30 and 32 such that no chafing, fretting and galling will occur.

One specific example of employing the nickeltitanium alloy on one-half inch OD tubing (1.27 cm.) includes thin-walled sections having a thickness from 0.010 inches to 0.020 inches (0.025 cm. to 0.051 cm.). The outside diameter of the main body portion 14 is 0.70 inches (1.78 cm.) while the collars 26 and 28 have an outside diameter of 0.60 inches (1.52 cm.). The relaxed bore diameter of the coupling is 0.470 inches (1.20 cm.). An alloy of nickel and titanium such as disclosed in Harrison et al, *HEAT RECOVERABLE METALLIC COUPLING*, Ser. No. 410,314, filed Oct. 29, 1973, has been found to comply with the requirements of the present invention.

Figure 5:
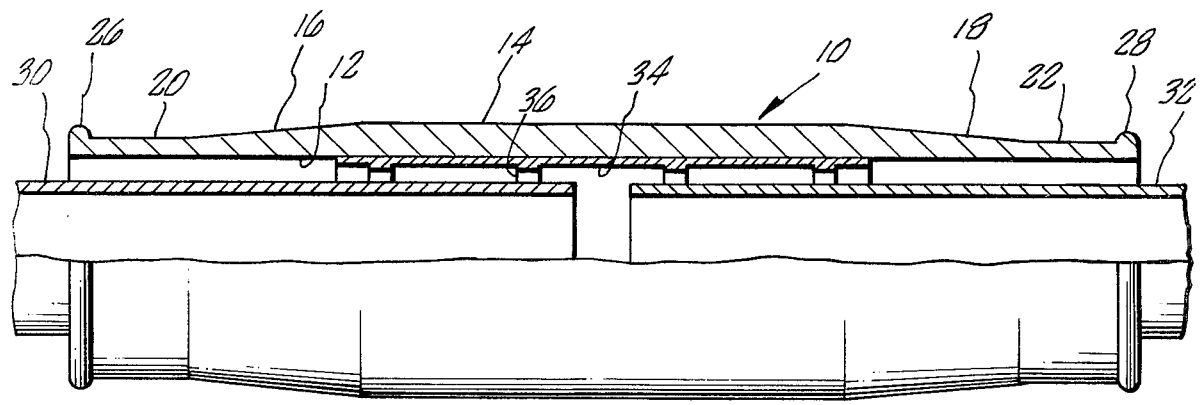
FIG. 5 is an elevation, partially in section, of an unrecovered coupling including an insert according to the present invention.
Figure 6:
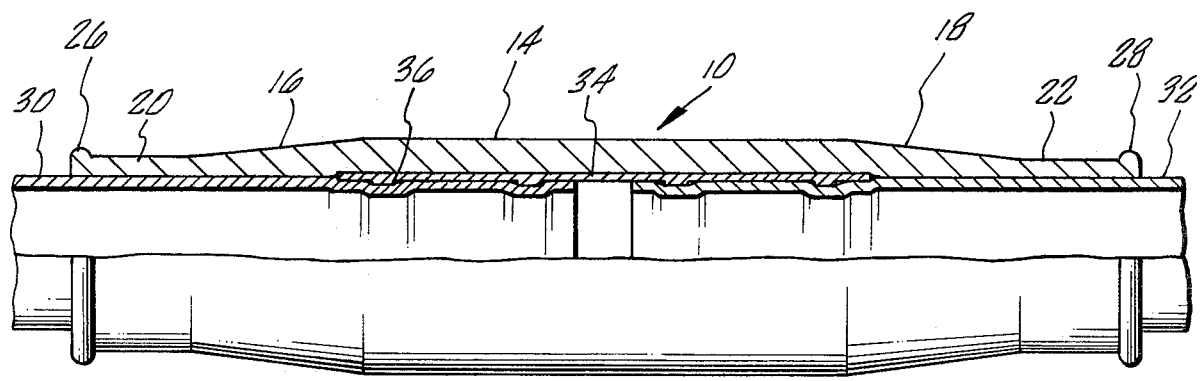
FIG. 6 is an elevation, partially in section, of the embodiment of FIG. 5 recovered about the tubing.

To illustrate the use of composite construction of the present invention, FIGS. 5 and 6 show the employment of a substantially cylindrical insert 34 having inwardly extending teeth 36. The inwardly extending teeth are intended to further deform the underlying tubes 30 and 32 as can be seen in the recovered view, FIG. 6. Thus, the insert illustrated is designed as a means for further increasing the holding capacity of the coupling. Inserts designed to accomplish other functions such as galling the inner ends of the tubes 30 and 32 are also contemplated by the present invention. A more detailed description of such inserts is provided in Martin, Composite Coupling, Ser. No. 608,209, filed Aug. 27,1975, which is assigned to the assignee of the present invention and is incorporated herein by reference. The insert disclosed is shown to be shorter in length than the overall length of the heat recoverable coupling member. However, where the insert is designed as a means for preventing corrosive action between the heat recoverable coupling and the tubing, it is advantageous to have the insert extend beyond the ends of the heat recoverable coupling. In the latter instance, the insert is preferably of a flexible or structurally weak nature in order that the advantages obtained by the rigid location of the collars 26 and 28 will not be compromised.

Thus, a coupling is provided which reduces or eliminates longitudinal motion between flexing tubes and the associated coupling and reduces the maximum bending stress experienced by the tubing at the coupling. In this way, chafing, fretting or galling of the tubing at the outer ends of the coupling is avoided. While embodiments and applications of this invention have been shown and described, it would be apparent to those skilled in the art that many more modifications are possible without departing from the inventive concepts herein described. The invention therefore, is not to be restricted except by the spirit of the appended claims.

What is claimed is:

1. A coupling for tubing comprising a hollow member fabricated from a heat recoverable metallic material sized to recover upon heating to grip such tubing, said hollow member comprising a main, hollow body section having at least one opening for receiving tubing, a hollow stress distribution section extending from each such opening of said main hollow body section, each said hollow stress distribution section including a decrease in wall thickness as compared with that of the main section away from said main, hollow body section such that a portion of said hollow stress distribution section is structurally no stronger than the tubing, and a collar located at the outer extremity of each such stress distribution section and being the outermost portion of said hollow member gripping the tubing upon recovery, each such collar having a recovery hoop strength sufficient to substantially prevent motion of each such collar longitudinally along the tubing when the tubing is subjected to flexural stress.

2. The coupling of claim 1 wherein each of said stress distribution sections include a tapered portion, the wall thickness of each tapered portion decreasing away from said main hollow body section, and a thin-walled portion of substantially uniform wall thickness extending outwardly from each tapered portion to each collar.

3. The coupling of claim 1 wherein said hollow member is of unitary construction.

4. The coupling of claim 2 wherein said thin-walled section has a longitudinal dimension equal to from about one-fifth to equal to the diameter of tubing with which the coupling is to be employed.

5. The coupling of claim 1 wherein said main hollow body section is substantially cylindrical and includes an opening at either end thereof.

6. The coupling of claim 1 wherein said main hollow body section includes means protruding into the hollow portion for gripping tubing and sealing against leadage.

7. The coupling of claim 1 wherein said hollow members are of nickel-titanium alloy.

8. The coupling of claim 1 wherein said hollow member has a smooth, continuous bore extending across each stress distribution section.

9. A coupling of claim 1 further including a substantially cylindrical insert disposed between said hollow member and the tubing.

10. A coupling for tubing comprising a hollow member fabricated from a heat recoverable metallic material, said hollow member comprising a main, hollow body section having at least one opening for receiving tubing, a stress distribution section associated with each said opening, said stress distribution section being in contact with the tubing over substantially the entire length of said stress distribution section when said coupling is recovered on the tubing, and a collar located at the outer extremity of each such opening, each said main, hollow body section having substantially greater flexural strength than the tubing, said stress distribution section having a strength gradient such that the outer end of said stress distribution section has a flexural strength less than the tubing, each such collar having a wall thickness greater than said stress distribution section adjacent said collar and a recovered inside dimension smallar than the corresponding outside dimension of said tubing such that said collar will have a resistance to motion along the tubing greater than the flexural strength of each said stress distribution section when said coupling is recovered on the tubing to substantially prevent motion of each such collar longitudinally along the tubing when the tubing is subjected to flexural stress.

11. A coupling for tubing comprising a hollow member fabricated from a heat recoverable metallic material sized to recover upon heating to grip such tubing, said hollow member comprising a main, hollow body section having at least one opening for receiving tubing, a stress distribution section associated with each opening of said main, hollow body section and including a tapered portion, the wall thickness of said tapered portion decreasing away from said main, hollow body section and a thin-walled section extending from the end of each tapered portion and a collar located at the outer extremity of each such thin-walled section and being the outermost portion of said hollow member gripping the tubing upon recovery, each such thin-walled section having flexural strength no greater than that of the tubing with which the coupling is to be employed, each such collar having a transverse wall thickness substantially greater than each said thin-walled section, each said collar having a recovery hoop strength sufficient to develop resistance to motion of each such collar longitudinally along the tubing which is greater than the linear flexural strength of each said stress distribution section to substantially prevent motion of each such collar longitudinally along the tubing when the tubing is subjected to flexural stress.

* * * * *

UNITED STATES PATENT AND TRADEMARK OFFICE
CERTIFICATE OF CORRECTION

PATENT NO. : 4,135,743
DATED : January 23, 1979
INVENTOR(S) : John R. Hughes

It is certified that error appears in the above-identified patent and that said Letters Patent are hereby corrected as shown below:

Amend the specification by inserting before the first line the sentence: -- This is a continuation of application serial no. 651,262, filed January 22, 1976. --

Signed and Sealed this

Twenty-second Day of May 1979

[SEAL]

Attest:

RUTH C. MASON
Attesting Officer

DONALD W. BANNER
Commissioner of Patents and Trademarks